United States Patent [19]
Joullie et al.

[11] 3,896,121
[45] July 22, 1975

[54] S-(β-SUBSTITUTEDAMINO-ETHYL)-CYSTEINE

[75] Inventors: Maurice Joullie, St-Germain-en-Laye, France; Lucien Lakah, Paris; Gabriel F. Maillard, Paris; Pierre Muller, Paris, all of France

[73] Assignee: Recherches Pharmaceutiques et Scientifiques, Paris, France

[22] Filed: Oct. 2, 1972

[21] Appl. No.: 294,105

[30]    Foreign Application Priority Data
    Oct. 4, 1971  France .............................. 71.35680

[52] U.S. Cl..................260/247.1 R; 260/268 R; 260/268 PH; 260/293.73; 260/293.85; 260/326.2; 260/534 S; 424/248; 424/250; 424/267; 424/274; 424/319
[51] Int. Cl. ......C07c 149/24; C07d 29/36; C07d 87/46

[58] Field of Search... 260/247.1 R, 293.85, 326.84, 260/268 R, 534 S, 326.2

[56]    References Cited
    OTHER PUBLICATIONS

Hope et al., J. Chem. Soc. (C), (1966) pp. 1098–1101.

Hermann et al., C.A., 72: 67238p, (1970).

*Primary Examiner*—Lorraine A. Weinberger
*Assistant Examiner*—Michael Shippen
*Attorney, Agent, or Firm*—Stevens, Davis, Miller & Mosher

[57]    ABSTRACT

New basic derivatives of cysteine, having a favourable action on epithelia as well as on their secretions, are characterised by carrying a (tertiary amino)-ethyl group or a (tertiary amino)-benzyl group attached to the sulphur atom of cysteine.

2 Claims, No Drawings

S-(β-SUBSTITUTEDAMINO-ETHYL)-CYSTEINE

The invention relates to new basic derivatives of cysteine and pharmacologically acceptable acid addition salts thereof, as well as to their preparation and their applications.

Its purpose is especially to provide new sulphurcontaining compounds which are capable of having a favourable action on epithelia as well as on their secretions.

The new compounds are characterised in that they carry a tertiary amine radical at the end of a carbon chain bonded to the sulphur atom of cysteine, specifically a (tertiary amino)-ethyl group, the tertiary amino group being the radical of dimethylamine, diethylamine, pyrrolidine, piperidine, morpholine or 4-methyl-piperazine, or a (tertiary amino)-benzyl group, the tertiary amino group being the radical of pyrrolidine, piperidine, morpholine or 4-methyl-piperazine.

In order to prepare these (tertiary-amine)-type compounds, it is possible, according to the invention, to react cysteine in the form of its hydrochloride with a (tertiary amino)-ethyl or (tertiary amino)-benzyl halide in the form of the hydrohalide, the halogen being chlorine or bromine, in the presence of an alkali metal hydroxide, in an aqueous medium.

The following Examples illustrate the invention.

EXAMPLE 1

S-(β-dimethylamino-ethyl)-cysteine (LJ 222) and its monohydrochloride (LJ 388)

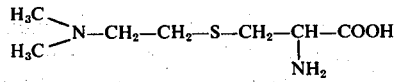

70 g (0.4 mol) of cysteine hydrochloride monohydrate in 100 ml of freshly distilled water are placed in a flask equipped with a stirrer and a nitrogen inlet.

48 g (1.2 mol) of sodium hydroxide dissolved in 100 ml of freshly distilled water are added gradually to the solution obtained.

The temperature is increased to about 60° and 120 g (approximately 30% excess) of β-dimethylamino-bromoethane hydrobromide are introduced over the course of 20 minutes.

The solution obtained is passed over a Dowex 50 resin and eluted with ammonia solution containing 33% by volume of $NH_4OH$.

The elution product is distilled in vacuo to dryness, the residue is dried in vacuo in the presence of a dehydrating agent and the product is finally recrystallised from absolute ethanol. 49 g (64% yield) of it are obtained.

Melting point = 212° – 213°;
isoelectric point = 6.32
Rf = 0.489

Analysis gives for $C_7H_{16}O_2N_2S$ (molecular weight = 192)

| calculated | C % | 43.75 | found | 43.80 |
|---|---|---|---|---|
| — | H % | 8.33 | — | 8.70 |
| — | N % | 14.58 | — | 14.10 |
| — | S % | 16.66 | — | 16.72 |

In order to obtain the hydrochloride from the base, 0.1 mol of the latter, for example, is suspended in 60 ml of water, the theoretical amount of normal hydrochloric acid is added, the solution is brought to dryness under 15 mm of mercury and the residue is dried azeotropically as a suspension in benzene and then the product is dried in vacuo.

EXAMPLE 2

S-(β-diethylamino-ethyl)-cysteine (LJ 427):

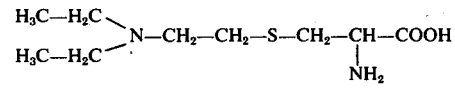

This product is prepared in accordance with the technique of Example 1 from:

43.52 g of β-diethylamino-chloroethane hydrochloride (0.23 mol + 10% excess) and 40.36 g of cysteine hydrochloride monohydrate (0.23 mol).

15.9 g (31% yield) of it are obtained.
Melting point approximately 215°;
Isoelectric point = 8.99
Rf = 0.53

EXAMPLE 3

S-(β-pyrrolidino-ethyl)-cysteine (LJ 428)

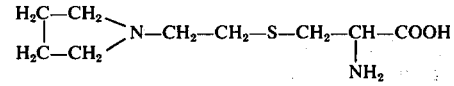

It is prepared in accordance with the same technique with:

11 g of β-pyrrolidino-chloroethane hydrochloride (0.065 mol), 9.27 g of cysteine hydrochloride (0.058 mol) and 7.3 g of NaOH (0.065 mol).

The product is recrystallised from methanol. 8 g (yield: 63%) of it are obtained.

Melting point = 213.5°.
Analysis gives for $C_9H_{18}N_2SO_2$ (molecular weight = 218)

| calculated | C % | 51.72 | found | 51.73 |
|---|---|---|---|---|
| — | H % | 8.63 | — | 8.69 |
| — | N % | 12.07 | — | 11.70 |

Isoelectric point = 8.97
Rf = 0.534

EXAMPLE 4

S-(β-morpholino-ethyl)-cysteine (LJ 223) and its monohydrochloride (LJ 394)

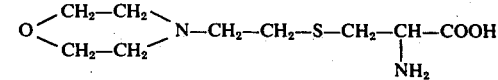

The same technique is applied with 35.1 g (0.2 mol) of cysteine hydrochloride monohydrate in 60 ml of distilled water, 24 g (0.6 mol) of NaOH in 60 ml of distilled water and 39 g (0.2 mol + 5% excess) of β-chloroethyl-morpholine.

After passing over a Dowex 50 resin, the product is recrystallised from a mixture of 200 ml of ethanol and 30 ml of water.

22 g (yield: 47%) of it are obtained.

Melting point = 237° – 238° (instantaneous block) or 205° – 206° (capillary tube), isoelectric point = 6.56

Rf = 0.564.

Analysis gives for $C_9H_{18}O_3N_2S$ (molecular weight = 234):

| calculated | C % | 46.15 | found | 45.75 |
|---|---|---|---|---|
| — | H % | 7.69 | — | 7.62 |
| — | N % | 11.95 | — | 11.82 |
| — | S % | 13.67 | — | 13.30 |

EXAMPLE 5

S-(β-piperidino-ethyl)-cysteine (LJ 225) and its monohydrochloride (LJ 393).

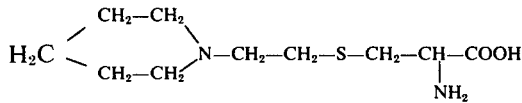

The same technique is applied with:

57 g of cysteine hydrochloride monohydrate (0.325 mol), 40 g of NaOH (1 mol) and 66 g of β-piperidino-chloroethane hydrochloride (0.358 15 mol).

The crude product is passed over 1 kg of Dowex resin and recrystallised twice from 96% strength ethanol.

35 g (yield: 40%) of it are obtained.

Melting point = 216°–217°; isoelectric point = 8.88

Rf : 0.556

Analysis gives for $C_{10}H_{20}O_2N_2S$ (molecular weight : 232)

| calculated | C % | 51.72 | found | 51.73 |
|---|---|---|---|---|
| — | H % | 8.63 | — | 8.69 |
| — | N % | 12.07 | — | 11.70 |

EXAMPLE 6

S-[β-(4-methyl-piperazino)-ethyl]-cysteine (L.J. 541):

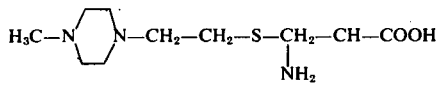

The same technique is applied with 22.35 g of cysteine hydrochloride monohydrate (0.273 mol) in 100 ml of distilled water, 21.4 g of NaOH (0.534 mol) and 33 g of 1-methyl- 4-(β-chloroethyl)-piperazine dihydrochloride (0.140 mol).

The mixture is heated for 1 hour at 60°, 9 g of the same hydrochloride (30% excess) are then added and the mixture is heated for 1 hour at 80° and then for 3 hours at between 60° and 70°.

The solution is treated with Dowex 50 resin and recrystallised from ethanol.

Melting point = 205°–206°; isoelectric point = 8.30

Rf = 0.14

Analysis gives for $C_{10}H_{21}N_3O_2S$:

| C % | calculated | 48.58 | found | 48.27 |
|---|---|---|---|---|
| H % | " | 8.50 | " | 8.62 |
| N % | " | 17.00 | " | 16.85 |
| S % | " | 12.95 | " | 13.21 |

The compounds of Examples 1 to 6 were subjected to pharmacological experiments, the results of which are given below.

Toxicology

The maximum doses tolerated (MDT) in mice, during oral administration, are given in Table 1 below, the compounds having first been neutralised, because of their high basicity, by means of hydrochloric acid; the compound LJ 541 was administered intraperitoneally and it is its LD 50 which is given.

TABLE I

ACUTE TOXICITY

| LJ 388 | MDT | ≧5 g/kg* |
|---|---|---|
| LJ 225 | MDT | ≧4 g/kg |
| LJ 394 | MDT | ≧5 g/kg |
| LJ 394 | LD 50, | i.v.8.2 g/kg |
| LJ 427 | MDT | ≧5 g/kg |
| LJ 428 | MDT | ≧5 g/kg |
| LJ 541 | MDT | ≧5 g/kg |

*Since the products are very basic, they are neutralised before the toxicity experiment by means of 2 N HCl.

Effect on the bronchial epithelium and its secretion

In order to create experimentally a bronchial hypersecretion, male rats of 200 g, in a leakproof cage, are daily made to inhale $SO_2$ at a concentration of 300 ppm, for 2 to 5 hours per day and are made to do so for 5 days per week.

After approximately 120 hours of inhalation, an endobronchial retention of mucus is observed.

After killing the animals by cutting the abdominal aorta, under nembutal-induced anaesthesia, the left lung is removed, fixed in formaldehyde and cut along the main bronchus after endotracheal colouration by means of Alcian Blue. The bronchus is examined under binocular magnification, in an aqueous medium, and for each lung, the presence or absence of bronchial retention is noted, as well as its appearance (compact plug, nodular agmen, blistery agglomeration and the like).

A quantitative and qualitative estimate of a secretion of mucus in the various batches is thus obtained.

A left lung is fixed in Dubosq-Brasil liquid, set in paraffin and cut in such a way that the complete bronchial tree, namely the main bronchus with four branches, can be spread on a histological slide. The muciparous cells are coloured by means of PAS (periodic acid Schiff) in accordance with the Hotchkiss-Mac Magnus technique.

Thiol groups are detected by 6,6'-dihydroxydinaphthyl 2,2'-disulphide in the bronchial mucus, on the histological sections thus prepared.

100 male rats of 200 g were subjected to repeated inhalations of $SO_2$, in accordance with the technique described above. From the start of the experiment, three animals which showed hypersensitivity to $SO_2$ were removed. After 80 hours exposure to the irritant gas, seven rats were killed and autopsies were carried out on them to verify bronchial hypersecretion.

From this time, the 90 remaining animals were divided into nine batches of 10 and, whilst being subjected to the inhalation sessions, they were given respectively:

Batch 1: distilled water 1 ml
Batch 2: L.J. 338 (HCl)
Batch 3: L.J. 427
Batch 4: L.J. 428            } 500 mg/kg, administered orally, in a volume of 1 ml
Batch 5: L.J. 223 (HCl)
Batch 6: L.J. 225
Batch 7: L.J. 541 daily, 5 days per week, for 16 days, which corresponds to 110 hours of inhalation of $SO_2$.

The number of animals showing endobronchial retention of mucus is shown in the following table:

TABLE II

| | |
|---|---|
| Controls, $SO_2$ alone: | 8/10 |
| L.J. 223: | 3/10 |
| L.J. 541: | 3/10 |
| L.J. 225: | 3/10 |
| L.J. 428: | 4/10 |
| L.J. 427: | 4/10 |
| L.J. 388: | 5/10 |

A decrease in the caliciform hyperplasia, demonstrated by colouration with P.A.S., is observed with all the derivatives studied.

At the level of the bronchial mucus, a disappearance of the SH groups is observed only in the batch of controls irritated by $SO_2$. In all the other batches, wherein the animals are treated with one of the new derivatives of cysteine, SH groups are present.

It is obvious from what has been stated above that the new derivatives of cysteine have a favourable action on the secretion of bronchial epithelium, bringing the amount of mucus produced back to the normal level and restoring biochemical equilibrium to a perturbed bronchial wall.

These new derivatives can consequently be used as active principles of medicines, particularly medicines for oral administration in pneumology (bronchalpneumopathy and acute and chronic bronchitis) and in oto-rhino-laryngology (acute sinusitis, acute otitis and rhino-pharyngitis).

In each of the examples given below, any one of the S-(amino-alkyl)-cysteine derivatives other than that which is stated, can be used.

Granules:

| | |
|---|---|
| LJ 223 | 10 g |
| Colloidal silica gel | 0.5 g |
| Sucrose | 88.5 g |
| Polyvinylpyrrolidone | 1 g |

For example, the LJ 223, the silica gel and the sucrose are mixed in a mixer-mill of the usual type. The mixture is moistened with a 5% strength aqueous solution of polyvinylpyrrolidone until a mass is obtained which is granulated and dried in an oven.

After drying, it is possible to perfume the granules by spraying an essence, for example, orange essence.

Gelatine-coated pills:

| | |
|---|---|
| LJ 394 | 0.100 g or 0.200 |
| Talc | 0.024 g or 0.048 |
| Silica gel | 0.001 g or 0.002 |
| for a gelatine-coated pill of | 0.125 g or 0.250 |

The gelatine-coated pills are prepared by dividing the mixture of the above powders by means of a machine of the usual type for filling gelatine-coated pills.

Tablets:

| | |
|---|---|
| LJ 225 | 0.400 |
| Silica gel | 0.010 g |
| Stearic acid | 0.020 g |
| Wheat starch | 0.045 g |
| for a completed tablet containing | 475 mg. |

The tablets are manufactured by direct compression of the mixture of the constituents in a machine of the usual type. Dragee-type tablets:

The above tablets can be made into dragees by the conventional methods by coating with sugar, using a dragee-manufacturing rotating drum.

The coating consists of mixtures of powders such as gum arabic, starch, calcium carbonate, talc and sucrose The addition of these excipients brings the dragees to a final weight of 700 mg.

Suppositories:

| | |
|---|---|
| LJ 393 | 0.200 g or 0.300 g |
| Lactose | 0.100 g or 0.200 g |
| Suppository excipient, q.s.p. | 1 g or 1.500 g |

The suppository excipient is either cacao butter or, preferably, a fatty acid glyceride such as described in the French Codex of 1965, under the heading "Semi-synthetic glycerides" pages 527 to 529.

The suppositories are manufactured in accordance with the following method:
a. mixing of the S-(amino-alkyl)-cysteine with the lactose, and
b. incorporation of this mixture into the melted excipient and casting in suitable moulds.

Drinkable solutions:
a. Drops:

Concentrated solution to be administered as drops:

| | |
|---|---|
| LJ 428 | 15 g |
| Glucose | 10 g |
| Methyl para-hydroxy-benzoate | 0.15 g |
| Distilled water, q.s.p. | 100 g |

The methyl para-hydroxy-benzoate is dissolved at 80° in water, and then the compound LJ 394 and the glucose are added. The volume is made up to the desired level and the solution is filtered.
b. Syrup:

| | | |
|---|---|---|
| LJ 394 | 2 g or | 5 g |
| Methyl para-hydroxy-benzoate | 0.15 g | 0.15 g |
| Sucrose | 50 to 70 g | 50 to 70 g |
| Distilled water q.s.p. | 100 g | 100 g |

The methyl para-hydroxy-benzoate is dissolved in water at 80° and then the morpholino-ethyl-cysteine hydrochloride (LJ 394) is added and, when it is dissolved, the sucrose is added When the whole is limpid, it is filtered and divided into flasks.

The syrup can be scented with, for example, raspberry or cherry concentrate or any other scent.

The syrup can be coloured with a pharmaceutically tolerated dyestuff such as tartrazine.

The new derivatives can also be used in dermatology, (illnesses of exposed parts of the body, excess perspiration and seborrhea), in gynaecology (trophic disorders of the vaginal mucous membrane, vaginitis and cervicitis) and in cosmetology, by virtue of the trophic action of these derivatives, especially the restoration of the SH groups of the damaged mucous membrane, on epithelia such as those of the vagina and of the skin.

The following examples illustrate the invention in these applications.

Dermatological cream for the skin:

| | |
|---|---|
| LJ 223 | 2 g or 5 g |
| Glyceryl monostearate | 8 g |
| Diethylene glycol monostearate | 6 g |
| Paraffin oil | 5 g |
| Sweet almond oil | 3 g |
| Isopropyl myristate | 5 g |
| Poly-oxy-ethylene sorbitan oleate | 3 g |
| Poly-oxy-ethylene sorbitan stearate | 1 g |
| Sorbic acid | 0.10 g |
| Water + scent q.s.p. | 100 g |

In order to prepare the cream, the fatty materials are melted at 65°, the sorbic acid, followed by the LJ 223, are dissolved in hot water and the sorbitan oleate and stearate are added; the melted fatty materials are added to the solution, at 60°, and the mixture is stirred until cold; the perfume is added.

The amount of the various constituents of the excipient can vary depending on whether a harder or softer cream is desired and the LJ 223 can be replaced by another derivative.

Cream for the treatment of nails:

| | |
|---|---|
| LJ 394 | 3 g to 5 g |
| Cholesterol | 2 g |
| Lanolin | 20 g |
| Sorbitol | 5 g |
| Glyceryl stearate | 12 g |
| Poly-oxy-ethylene sorbitan oleate | 4 g |
| Sorbic acid | 0.2 g |
| Water, q.s.p. | 100 g |
| Scent + dyestuffs, q.s. | |

Working at 60°, the glyceryl monostearate and the lanolin, previously melted at 65°, are added to a solution, prepared under hot conditions, of sorbic acid in water to which the S-(morpholino-ethyl)-cysteine salt, the cholesterol, the sorbitol, the poly-oxy-ethylene sorbitan oleate and the dyestuff have been added.

The mixture is stirred until cold and then the scent is added.

Cleansing and treatment milk:

| | |
|---|---|
| LJ 427 | 2 g to 5 g |
| Lanolin oil | 2 g |
| Propylene glycol | 10 g |
| Propylene glycol monostearate | 5 g |
| Vaseline oil | 2 g |
| Sodium lauryl-sulphate | 1.5 g |
| Methyl para-hydroxy-benzoate | 0.15 g |
| Water, q.s.p. | 100 g |
| Scent, q.s. | |

Lotion for the scalp:

| | |
|---|---|
| S-($\beta$-pyrrolidino-ethyl)-cysteine, LJ 428 | 3 g |
| Castor oil | 0.5 g |
| Propylene glycol | 1 g |
| Ethyl alcohol | 50 g |
| Distilled water, q.s.p. | 100 g |
| Scent, q.s. | |

Preparation by simple solution.
Billiantine liquid:

| | |
|---|---|
| LJ 225 | 5 g |
| Castor oil | 3 g |
| Diethylene glycol | 5 g |
| Ethyl alcohol | 30 g |
| Distilled water, q.s.p. | 100 g |

Preparation by simple solution.
Brilliantine cream:

| | |
|---|---|
| LJ 428 | 5 g |
| Castor oil | 3 g |
| Perhydrosqualene | 3 g |
| Poly-oxy-ethylene glycol stearate | 10 g |
| Poly-oxy-ethylene glycol oleate | 1 g |
| Sorbic acid | 0.20 g |
| Water, q.s.p. | 100 g |
| Scent, q.s. | |

In order to prepare the brilliantine, the sorbic acid is dissolved at 80° in the water and the cysteine derivative is added, after which the poly-oxy-ethylene glycol stearate and oleate are added, followed by the perhydrosqualene and the castor oil. The mixture is left to cool and is perfumed. Tablets for gynaecology:

a)
| | | |
|---|---|---|
| L.J. 394 | 0.150 g | for a table of 4 g |
| Lactose | 1.350 g | |
| Granulated excipient | 2.500 g | |

The granulated excipient is mixed with the other powders and the mixture is compressed.

b)
| | | |
|---|---|---|
| L.J. 428 | 0.100 g | for a tablet of 2.5 g |
| Boric acid | 0.050 g | |
| Granulated excipient | 2.350 g | |
| Lavender essence | 0.1 ml | |

The granulated excipient has the following composition:

| | |
|---|---|
| Granulated lactose excipient | 800 g |
| Alginic acid | 200 g | a)
| | | |
|---|---|---|
| L.J. 393 | 0.100 g | for an pill of 2 g |
| Lactose | 0.200 g | |
| Imhausen E or H excipient | 1.700 g | |

The L.J. 393 is mixed with the lactose and incorporated into the excipient at 37°.

| b) | L.J. 427 | 0.100 g | for an pill of 3 g |
|---|---|---|---|
| | Monosodium phosphate | 0.200 g | |
| | Sodium bicarbonate | 0.200 g | |
| | Imhausen excipient | 2.500 g | |

In the different examples proposed, it is possible to envisage combinations with local antiseptics, bactericidal agents, anti-fungal agents, and in the case of vaginal pills, trichomonocides.

Deodorant lotion (underarms)

| Boric acid | 0.200 g |
|---|---|
| Propylene glycol | 1.000 g |
| Camphor (10% strength solution in alcohol) | 0.100 g |
| Hexachlorophene | 0.500 g |
| 95% strength ethyl alcohol | 62.000 g |
| L.J. 223 | 2.000 g |
| Water | 34.000 g |
| Perfume and dyestuff, q.s. | |

Deodorant cream: (underarms)

| L.J. 428 | 5 g |
|---|---|
| Glyceryl stearate | 15 g |
| Polyethylene glycol stearate | 7 g |
| Spermaceti | 4 g |
| Isopropyl myristate | 4 g |
| Lanolin | 6 g |
| Water | 59 g |
| Perfume and preservative, q.s. | |

We claim:
1. A cysteine derivative selected from the group consisting of S-($\beta$-dimethylamino-ethyl)-cysteine, S-($\beta$-diethylaminoethyl)-cysteine, S-($\beta$-pyrrolidino-ethyl)-cysteine, S-($\beta$-morpholinoethyl)-cysteine, S-($\beta$-piperidino-ethyl)-cysteine and S-[$\beta$-(4-methylpiperazino)-ethyl]-cysteine or a monohydrochloride thereof.
2. The cysteine derivative S-($\beta$-morpholino-ethyl)-cysteine or its monohydrochloride.

* * * * *